Dec. 17, 1940.　　　　P. CHRSTOS, JR　　　　2,225,296

VALVE SEAT

Filed April 3, 1939

INVENTOR.
PAUL CHRSTOS JR.
BY
ATTORNEY.

Patented Dec. 17, 1940

2,225,296

UNITED STATES PATENT OFFICE 2,225,296

VALVE SEAT

Paul Chrstos, Jr., Philadelphia, Pa.

Application April 3, 1939, Serial No. 265,698

1 Claim. (Cl. 251—155)

This invention relates to valves and is concerned primarily with those valves including a central partition which is formed with an opening with which is associated a valve seat.

The invention has in view, as its foremost objective, the provision of a valve seat which is adapted to be positioned in the opening aforesaid, together with means for detachably holding said valve seat in position in the opening.

More in detail, this invention has, as an object, the provision of a removable valve seat including a tubular portion having an outer conical wall that is adapted to be received in the said opening in the valve casing with a driven fit.

Still another object is the provision of a removable valve seat of the character above-noted, which includes a tubular portion that is adapted to extend through and beyond the wall of the valve casing in which it is positioned with the protruding portion formed with openings adapted to receive a pin that constitutes a retaining means. This pin may be deformed by the use of a tool and its accidental removal prohibited.

Various other more detailed objects and advantages of the invention will in part become apparent and in part be hereinafter stated as the description of the invention proceeds.

The invention, therefore, comprises a valve casing having a wall formed with an opening in which is removably positioned a valve seat. The valve seat includes a tubular part extending through and beyond the said opening. The outer wall of the tubular part is tapered and engages the wall of the opening with a driven fit. The projecting portions of the tubular part are formed with openings in which is received a pin that is deformed to prevent its removal. The upper end of the tubular casing is formed with a shoulder that overhangs and engages the lip of the casing wall about the opening.

Figure 1:
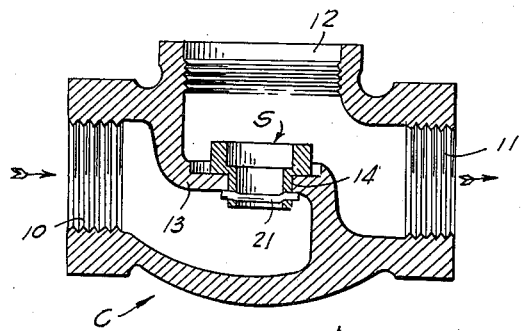
Figure 2:
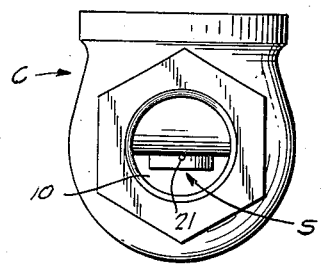
Figure 3:
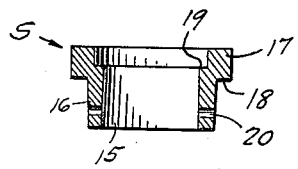
Figure 4:
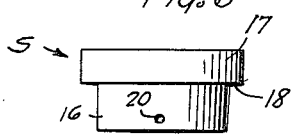
Figure 5:

For a full and more complete understanding of the invention, reference may be had to the following description and accompanying drawing, wherein:

Figure 1 is a sectional view through a valve casing together with a removable valve seat which is assembled therewith in accordance with the precepts of this invention, Figure 2 is an end elevational view of the casing shown in Figure 1, Figure 3 is a sectional view through the valve seat per se, Figure 4 is a side elevational showing of the valve seat per se, and Figure 5 is a perspective view of the retaining pin.

A valve casing of the well-known type is shown in Figure 1 and referred to generally by the reference character C. The casing C includes the usual inlet port 10, outlet port 11, and an upper opening 12 that ordinarily carries the valve mechanism. Between the inlet port 10, outlet port 11 and beneath the opening 12 is a horizontal web or wall 13 which is formed as an integral part of the casing C. This wall 13 is formed with an opening 14 in which the valve seat of this invention is positioned.

Referring for the moment more particularly to Figures 3 and 4, the valve seat of this invention is therein depicted and referred to in its entirety by the reference character S. The valve seat S may be made from any preferred material, although the invention has particularly in mind the use of a metal having the required properties of toughness, such as brass.

This valve seat S consists of a tubular part 15 having an outer wall 16 that is slightly tapered so that it assumes a truncated conical formation. When the valve seat S is positioned in the opening 14, the tapered wall 16 engages the wall of the opening 14 with a driven fit to provide a tight, leak-proof engagement.

At the upper end the tubular member 15 is enlarged to provide a flange 17 which is defined on the outer side by a shoulder 18 and on the inner side by a shoulder 19. When the valve seat S is in position the shoulder 18 overlies and engages the wall 13 about the edge of the opening 14.

In assembling the valve seat S in the casing C, the seat S is inserted through the opening 12 at the top, and the tubular part 15 driven into the opening 14. After the valve seat S has been driven home so that the shoulder 18 engages the wall 13, there will be a portion of the tubular part 15 projecting below the wall 13 as is clearly brought out in Figure 1.

This projecting portion of the tubular part 15 is formed with openings 20 that are in substantial alignment with each other and with the inlet port 10. As will be noted from Figure 1, the upper edge of the openings 20 are substantially flush with the lower surface of the wall 13. A retaining pin 21 may now be inserted in the openings 20, the inlet port 10 affording access for this operation.

After the pin 21 has been positioned in the openings 20, a suitable tool is inserted from the top through the opening 12 and the bore of the tubular part 15, into engagement with the portion of the pin 21 between the openings 20. This tool may then be struck a sharp blow to deform the pin 21 in the manner shown in Figure 1. Thus, removal of the pin is prohibited and the pin 21 remains in a position in which it in turn prevents removal of the valve seat S.

While a preferred specific embodiment of the invention is hereinbefore set forth it is to be clearly understood that the invention is not to be limited to the exact construction illustrated and described, because various modifications of these details may be provided in putting the invention into practice, within the purview of the appended claim.

I claim:

In combination a valve casing including inlet and outlet ports and formed with an opening therebetween designed to carry valve mechanism, a central web between said inlet and outlet ports and beneath the last-mentioned opening, said web being formed with an opening in alignment with said opening above said web, a valve seat in said opening, said valve seat including a tubular member formed with a flange at its upper end and which member is adapted to be inserted in position through the opening in the casing, said tubular member being formed with openings in alignment with each other and with one of the ports of the valve casing whereby a pin is passable through said post to be positioned in said last mentioned aligned openings, and a pin in said aligned openings, said pin being deformed beneath said aligned openings in said web and casing to prevent its removal from the openings, said pin having ends projecting beyond the outer end of the tubular part and engaging the underside of the central web to prevent removal of the valve seat.

PAUL CHRSTOS, Jr.